Oct. 25, 1960   C. W. BRABENDER ET AL   2,957,673
APPARATUS FOR SELECTING SAMPLES OF PREDETERMINED WEIGHT
Filed June 13, 1955   5 Sheets-Sheet 1
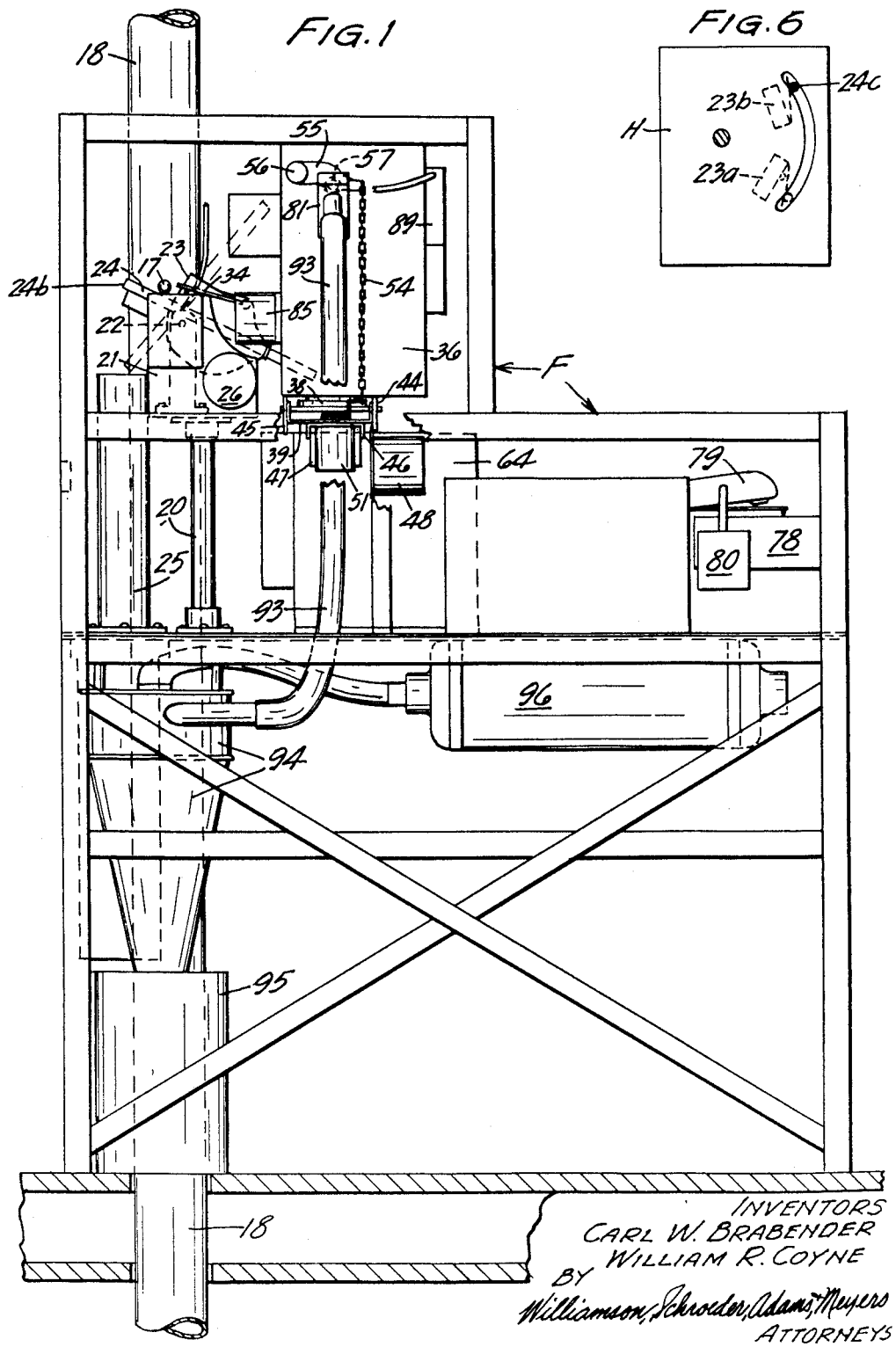
INVENTORS
CARL W. BRABENDER
WILLIAM R. COYNE
BY
Williamson, Schroeder, Adams, Meyers
ATTORNEYS Oct. 25, 1960 C. W. BRABENDER ET AL 2,957,673
APPARATUS FOR SELECTING SAMPLES OF PREDETERMINED WEIGHT
Filed June 13, 1955 5 Sheets-Sheet 2
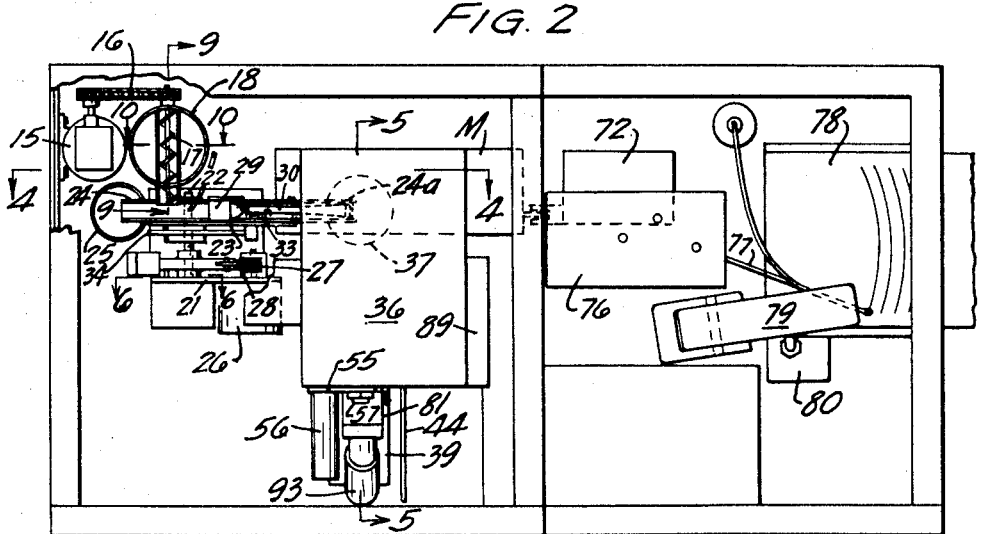
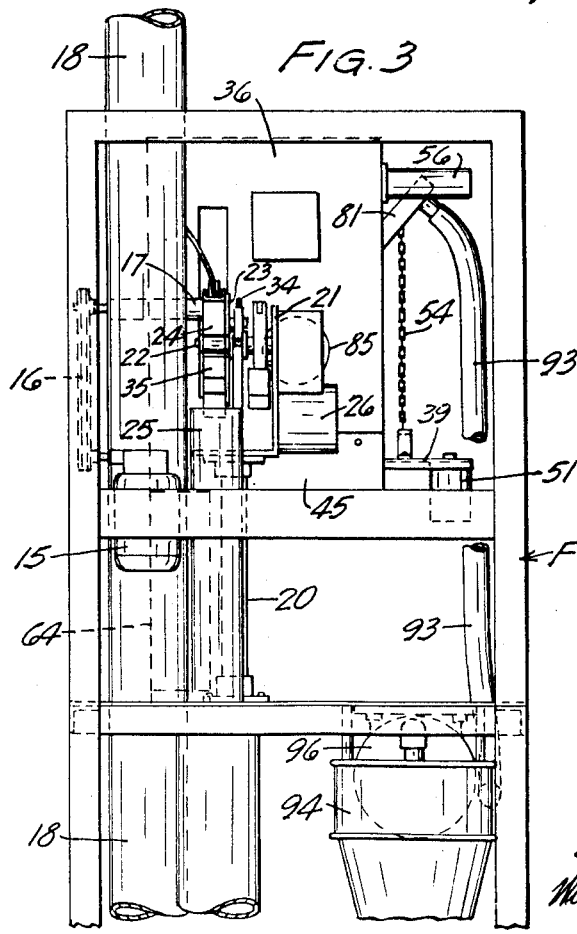
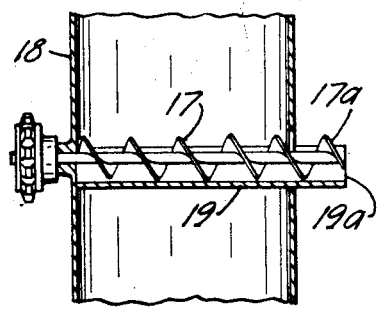
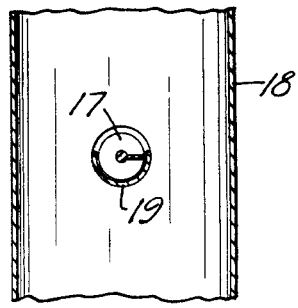
INVENTORS
CARL W. BRABENDER
WILLIAM R. COYNE
BY Williamson, Schroeder, Adams & Meyers
ATTORNEYS Oct. 25, 1960  C. W. BRABENDER ET AL  2,957,673
APPARATUS FOR SELECTING SAMPLES OF PREDETERMINED WEIGHT
Filed June 13, 1955  5 Sheets-Sheet 3

INVENTORS
CARL W. BRABENDER
WILLIAM R. COYNE
BY
Williamson, Schroeder, Adams & Meyers
ATTORNEYS Oct. 25, 1960   C. W. BRABENDER ET AL   2,957,673
APPARATUS FOR SELECTING SAMPLES OF PREDETERMINED WEIGHT
Filed June 13, 1955   5 Sheets-Sheet 4

INVENTORS
CARL W. BRABENDER
WILLIAM R. COYNE
BY
Williamson, Schroeder, Adams & Meyers
ATTORNEYS

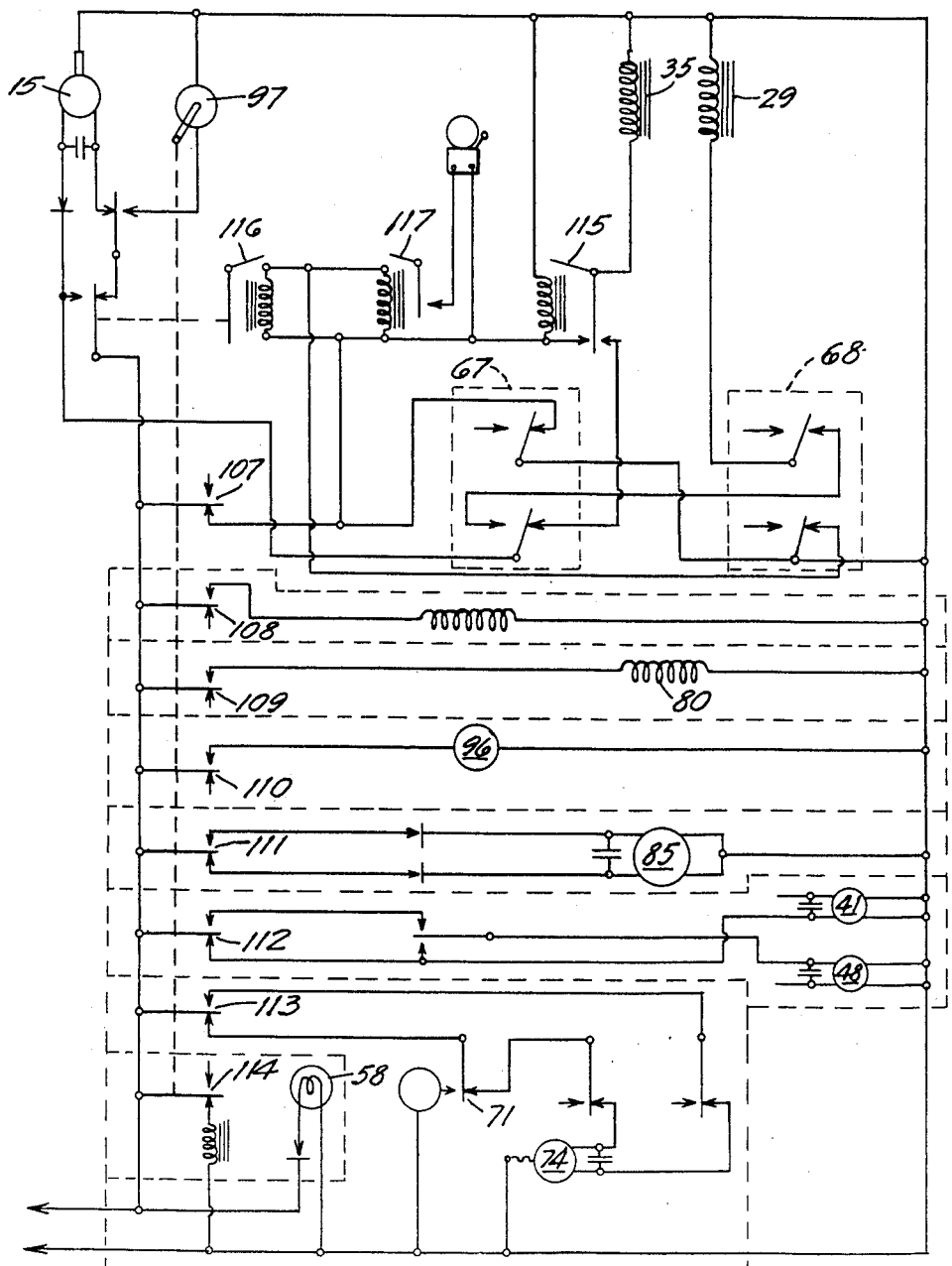

United States Patent Office 2,957,673
Patented Oct. 25, 1960

2,957,673

APPARATUS FOR SELECTING SAMPLES OF PREDETERMINED WEIGHT

Carl W. Brabender, Wayzata, and William R. Coyne, Minneapolis, Minn., assignors to The Pillsbury Company, a corporation of Delaware Filed June 13, 1955, Ser. No. 514,945

7 Claims. (Cl. 249—2)

This invention relates to apparatus for determining the moisture content of materials. More particularly, it relates to apparatus for selecting a sample of a predetermined weight and depositiing the same within a sample pan for testing purposes.

In the various testing procedures of material, it is imperative that samples of a predetermined weight of the material to be tested be utilized. The selection of samples of such predetermined weight, such as for example 10 grams, requires a great deal of time and effort and is a very substantial portion of the cost of conducting such determinations. Hence there is an urgent need for some type of apparatus which will eliminate or substantially reduce the cost of selecting such samples. Our invention is directed toward providing apparatus which will fulfill this need.

It is a general object of our invention to provide novel apparatus for selecting a sample of pulverulent material of predetermined weight.

A more specific object is to provide novel apparatus for directing a flow of material into a sample pan until a predetermined weight thereof has been deposited within the confines of the pan and then cutting off that flow into the pan.

Another object is to provide novel apparatus for directing a flow of material into a sample pan in position for weighing until a predetermined weight of the material has been deposited within the confines of the pan, and for then cutting off the flow and diverting the same away from the sample pan until after the selected sample has been tested and withdrawn from the pan.

Another object is to provide automatic apparatus for directing a flow of material into a sample pan while the latter is supported by a weighing unit and until a predetermined weight of the material to be tested has been deposited within the confines of the pan, and for thereupon automatically cutting off the flow of material and diverting the same away from the sample pan until after the selected sample has been tested and withdrawn from the pan.

These and other objects and advantages of the invention will more fully appear from the following description made in connection with the accompanying drawings, wherein like reference characters refer to the same or similar parts throughout the several views, and in which:

Fig. 1 is a side elevational view of one embodiment of our invention;

Fig. 2 is a plan view of the same;

Fig. 3 is a rear elevational view of the same embodiment of our invention;

Fig. 6 is a sectional view taken along line 6—6 of Fig. 2;

Fig. 9 is a vertical sectional view taken along line 9—9 of Fig. 2;

Fig. 10 is a vertical sectional view taken along line 10—10 of Fig. 2;

Fig. 14 is a wiring diagram showing the electrical lines connecting the various operating elements of the moisture content determining device.

Figure 4:
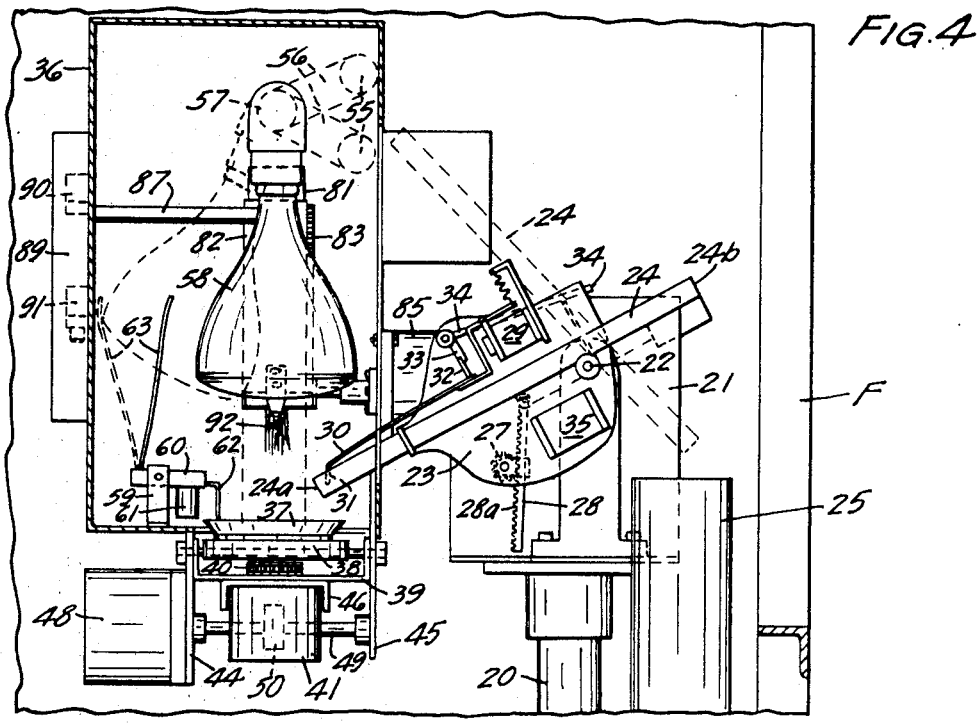
Fig. 4 is a fragmentary side elevational view of the moisture content determining device on an enlarged scale viewed from the side opposite to that of Fig. 1.

One embodiment of our invention, as shown in Figs. 1–14, may include a frame indicated generally as F. Mounted upon this frame F at one side thereof is an electric motor 15 which drives, by means of a chain drive 16, an auger conveyor 17 which, as best shown in Fig. 2, extends transversely through a stack 18 and protrudes through the walls thereof. The auger conveyor 17 is mounted for rotation about its longitudinal axis within an upwardly facing trough 19 which also extends across the entire width of the stack 18 and outwardly therefrom. The auger conveyor 17 has a discharge terminal 17a and the trough 19 has an associated discharge terminal 19a. The auger conveyor 17 when driven by the motor 15 and chain drive 16, rotates in such a direction as to convey material toward these discharge terminals. The conveyor 17 and trough 19 together form a sampling mechanism for withdrawing representative samples from the stack 18.

Mounted on a portion of the frame F and extending upwardly therefrom is a foot or support 20. Carried by the upper portion of this support 20 is a bracket 21 and journaled in this bracket is a pivot shaft 22 to which is secured a disc 23 for pivotal movement therewith about the longitudinal axis of the shaft 22. Mounted on the disc 23 for pivotal movement therewith is a tilting chute 24 which can be tilted about the axis of the shaft 22 with the disc 23 so that its discharging terminal 24a which extends toward the front of the machine may be in loading position relative to the sample pan, as best shown in Figs. 1 and 4, or in raised position as shown in broken lines in Fig. 1. The discharging end 24a of the chute 24 is open, as is its upper end portion 24b, so that flour may pass through either end at will, assuming its passage is not arrested by other elements as to be hereinafter described with respect to the discharge terminal 24a. The medial portion of the chute 24 is positioned directly below the discharge terminals 17a and 19a of the auger conveyor 17 and trough 19, respectively, so as to receive all of the flour conveyed by the conveyor 17.

Mounted on the frame F in position to receive flour from the rear end portion 24b of the tilting chute 24 when that end portion is swung downwardly, as shown in broken lines in Fig. 1, is a salvage conduit 25, the upper end of which is open. This salvage conduit 25 returns the flour received from the rear end portion 24b of the chute 24 back into the main stream of flour which has passed the moisture determining machine.

Mounted on the mounting bracket 21 is a chute tilting motor 26 which by a gear 27 drives vertically a tilting rod 28 which has gear teeth 28a formed on one side thereof and engaging and cooperating with the gear 27. The upper end of the rod 28 is pivotally connected to the chute 24 so as to tilt the chute as the rod 28 is driven upwardly or downwardly by the motor 26. This can best be seen in Fig. 4. The motor 26 is a reversible motor and is controlled in a manner to be hereinafter described.

Mounted on the disc 23 directly above the medial portions of the chute 24 is a pulsating vibrator 29 which carries a gate supporting arm 30 extending forwardly therefrom above the chute. At the forward end of the arm 30 is a depending gate member 31 which extends into the discharge terminal portion 24a of the chute. A catch 32 extends upwardly from the arm 30 in position to be engaged by a pivotable latch element 33, as shown in Fig. 4. To this latch element 33 there is connected a rearwardly extending camming lever 34 which swings with the latch element.

Also secured to the chute 24 is another electrical pulsating vibrator 35 which is controlled in a manner to be hereinafter described. A switch box housing H houses an upper and a lower limit switch 23a and 23b for the chute 24 and a pin 23c extends laterally from the disc 23 into the interior of the housing to engage these switches as the chute pivots.

Figure 5:
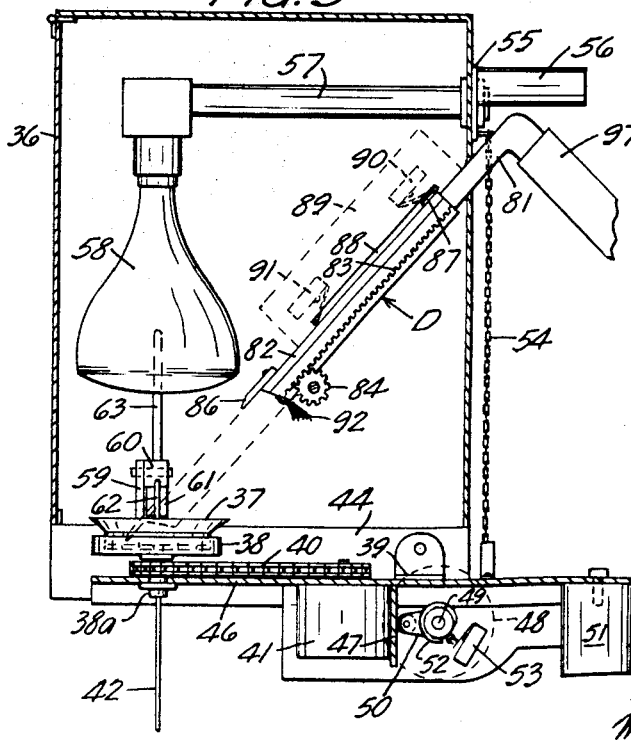
Fig. 5 is a fragmentary rear elevational view of the drying and sample-withdrawing mechanism of the moisture content determining device taken on an enlarged scale.
Figure 7:
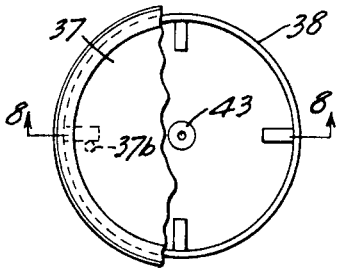
Fig. 7 is a plan view of the sample pan and pan driving support of the device with portions of the former broken away to show the latter, the view being taken on an enlarged scale.
Figure 8:
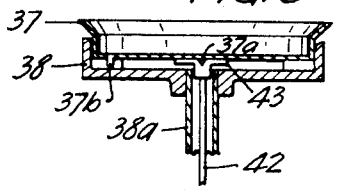
Fig. 8 is a vertical sectional view taken along line 8—8 of Fig. 7.

Mounted adjacent to the chute 24 is a drying chamber 36. The discharge terminal portion 24a of the chute extends through one of the walls of the chamber and is free to tilt upwardly therewithin. A sample pan 37 which extends upwardly through an opening in the bottom of the chamber 36, as best shown in Fig. 5, is supported in material-receiving position relative to the discharge terminal portion 24a of the chute. This pan 37 is supported by a pan driver 38 which is supported by a hollow drive shaft 38a and is journaled on a mounting plate or tilting beam 39 and driven by a chain drive 40 which in turn is driven by a pan driving electric motor 41. This can best be seen in Figs. 5 and 7. The underside of the pan 37 carries a depending centering or positioning pin 37a and a radially spaced depending drive pin 37b. The inside of the cup-shaped pan-driver 38 has a plurality of driving dogs 38b one of which engages the drive pin 37b of the pan to drive the same. Extending upwardly through the hollow drive shaft 38a is a pan support rod 42 with a pan support 43 at its upper end, the rod 42 being a part of a pan-weighing mechanism to be hereinafter described. The pan support 43 has a central recess within which the centering pin 37a extends, but the bottom of the pan 37 normally just clears the upper surface of the pan support 43.

The mounting plate 39 is pivotally supported by a pair of spaced depending journal plates 44 and 45 which extend downwardly from the chamber 36, as best shown in Fig. 4. An inverted channel member 46 is secured to the underside of the plate 39 and a pressure plate 47 extends downwardly from the medial portions thereof. Mounted on the side of the journal plate 44 is an electric beam tilting motor 48 which has a driving shaft 49 extending over to the journal plate 45 and carrying a cam 50 which engages the pressure plate 47 as it rotates with the driving shaft 49. This electric motor 48 is controlled in a manner to be hereinafter described and operates to tilt the mounting plate 39 so that it functions as a tilting beam. A weight 51 is secured to the end of the tilting beam 39 opposite to that carrying the pan driver 38 so as to constantly urge the latter upwardly toward pan-engaging position, as shown in Fig. 5. The shaft 49 also carries a second cam 52 which normally holds a microswitch 53 in closed position but releases it to open position when a recess on the cam is opposite the switch as shown in Fig. 5. The microswitch 53 is positioned within the circuit to the beam-tilting motor 48 so as to interrupt the current thereto when the cam 50 reaches the position shown in Fig. 5.

Secured to the weighted end portion of the tilting beam 39 is a chain 54 which extends upwardly and is secured to one end of a pivot lever 55, the other end of which carries a weight 56 and the medial portion of which is mounted upon a pivot shaft 57, as best shown in Fig. 1. The pivot shaft 57 extends in substantially the same direction as the tilting beam 39 and is journaled in the side wall of the drying chamber 36. An infrared lamp 58 is secured to the other end of the shaft 57 and swings therewith when the shaft pivots about its longitudinal axis. The lamp 58, when hanging straight downwardly from the shaft 57, is positioned directly above the sample pan 37 and directed thereinto.

Mounted upon the floor of the drying chamber 36 and extending upwardly therefrom is a post 59 upon which is pivoted a bar 60 carrying a weight 61 and a stirring rod 62 which extends downwardly into the pan 37 at its side walls and then toward and beyond the center of the pan and along its bottom. At the other end of the bar 60 and on the opposite side of the post 59 is an upwardly extending lever arm 63 which is positioned in the path of the swinging movement of the lamp 58 as best shown in Fig. 4, so that when the lamp 58 is swung sidewise away from the pan 37, the stirring rod 62 is also lifted to an aloft position out of the confines of the pan.

Mounted on the frame F below the drying chamber 36 is a weighing mechanism M. This mechanism M is preferably of the type shown in the United States Letters Patent No. 2,047,765, issued to Carl W. Brabender, dated July 14, 1936. The critical portions thereof are shown diagrammatically in Fig. 12 and include a beam balance 64 pivoting about a fulcrum 65 and supporting by one of its end portions, the pan support rod 42 which extends upwardly through the floor of the drying chamber 36. The other end portion carries a panel 66 which is positioned to pass between an electrovane 67 as that end portion is raised and also carries a panel 68 which is positioned to pass between an electrovane 69 when that end portion is raised still farther. The extreme end portion 70 of the beam balance 64 is positioned so that when an electrovane 71 is lowered, that end portion will pass through it and actuate the same just as the panels 66 and 68 actuate the electrovanes 67 and 69 respectively when they extend between opposite portions of each. These electrovanes are manufactured by the Brown Division, Philadelphia, Pennsylvania, of Minneapolis Honeywell Regulator Co., Minneapolis, Minnesota, and may be purchased from that company under the identification of Part No. 353848–1. They include a pair of spaced detecting coils which may be shielded from each other by passing a vane therebetween. When the vane is not shielding the detecting coils from each other, the electronic circuit de-energizes the relay of the unit and a circuit is closed to accomplish the desired action as hereinafter defined. The scale mechanism M may be purchased from the Brabender Corporation, Rochelle Park, New Jersey, and is identified by that company merely as a Brabender scale.

The electrovane 71 is carried by a gear mechanism 72 which is threadably mounted for vertical movement on a vertical threaded shaft 73, which is driven by a motor 74. A second threaded shaft 75 extends vertically through the gear mechanism 72 and threadably engages the same so that vertical movement of the gear mechanism 72 causes rotation of the shaft 75 about its longitudinal axis. A gear reduction mechanism 76 connects the upper end of the shaft 75 with a swingable recording pen 77 which inks the record of the extent of its swing upon a chart 78. This chart 78 is constructed, graduated and correlated with the extent of swing of the pen 77 so as to give a direct reading of the moisture content of the sample, the sample having been of a predetermined weight prior to having been dried. A time stamp mechanism 79 operated by a solenoid 80 records the time upon the chart 78 each time a recording is made.

Mounted upon and extending through one wall of the drying chamber 36 is a telescoping withdrawing or discharge chute D having a fixed upper portion 81 and a relatively movable portion 82, the latter of which has longitudinally arranged gear elements 83 on its outer surface cooperating with a drive gear 84 which in turn is driven by a reversible motor 85. When the gear 84 is driven, the lower portion 82 moves telescopically relative to the upper portion 81. A spacer element 86 extends downwardly from the lower end of the movable portion 82. A trip arm 87 extends laterally from the movable portion 82 and into a slot 88 formed by a housing 89 which covers an upper limit switch 90 and a lower limit switch 91. The chute is arranged so that the spacer element and the lower end portion 82 will extend within the confines of the pan 37 when at its lowermost position. A brush 92 is carried by the lower end of the portion 82 and this brush extends into the pan 37 and brushes the peripheral portions of the bottom of the pan to dislodge any particularly securely adhering particles of flour as the pan rotates.

The upper portion 81 is connected by a conduit 93 to a cyclone 94 which discharges the collected material into a collector 95. The upper end of the cyclone is connected to a suction creating mechanism 96 such as is used in a vacuum cleaner.

Figure 11:
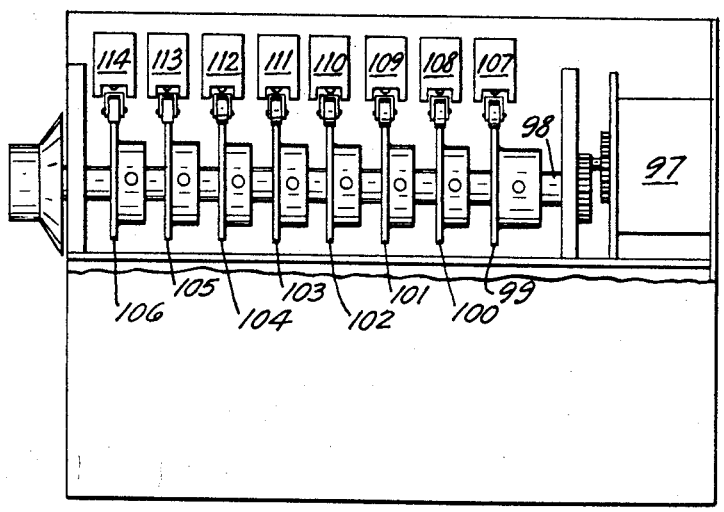
Fig. 11 is a side elevational view of the cam series connected with the timing motor, the view being shown on an enlarged scale.
Figure 12:
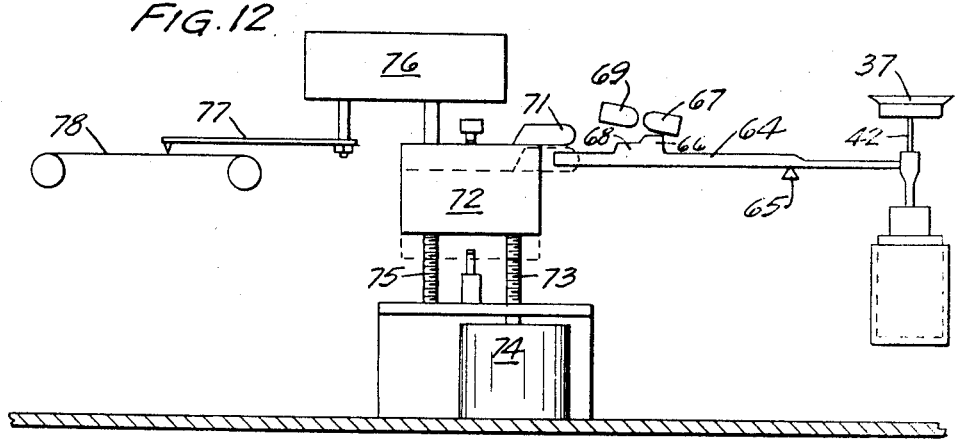
Fig. 12 is a diagrammatic view of the beam balance and recording mechanism showing the relation therewith to the other pan support.
Figure 13:
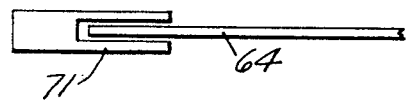
Fig. 13 is a plan view of the electrovane at the end of the beam balance as shown in Fig. 12.

Associated with the various motors, relays, and moving parts is a timer controlled camming mechanism C which is best shown in Fig. 11 and which is electrically connected with the various parts as best shown in Fig. 14. For the sake of reference there is employed a timer motor 97 which drives a main cam-carrying shaft 98. This shaft carries a number of cams indicated as 99, 100, 101, 102, 103, 104, 105 and 106. Each of these cams has a switch 107, 108, 109, 110, 111, 112, 113 and 114 respectively associated therewith and the switches are connected electrically as shown in Fig. 14. Each of these cams has at least one recess formed in its camming surface to release its switch during a part of its rotation with the shaft 98 and the remainder of its camming surfaces cam the switches inwardly. Some of these cams have more than one recess and some of these switches are three-way switches as will be described in more detail hereinafter.

Cam 100 actuates switch 108 which is electrically connected to a solenoid valve 118 which controls the passage of air through an air conduit 119 which is connected to a source of compressed air (not shown). The conduit 119 terminates within the tilting chute 24 and is directed so as to dislodge particles of the previous sample which may have stuck within the chute.

At the start of one of the cycles, the timer motor 97 is rotated and it turns the shaft 98 until the recess of cam 99 is opposite its switch member 107 which permits the switch member to move to closed position and thereby energize the two 10-second time delay relays 115, 116 shown only in the wiring diagram, Fig. 14, and the two-minute time delay relay 117, also shown only in Fig. 14. This switch member 107 as it closes, establishes a current also to the auger conveyor motor 15 and to the vibrator 35 on the chute 24. When these two 10-second relays close, they complete a circuit to the motor 26 which tilts the tiltable chute 24. As this motor 26 commences to tilt the chute 24, the tilting action swings an arm or pin 23c which releases a microswitch 23a which in turn breaks the circuit leading to the timing motor 97 and stops the latter. The chute 24 is tilted by the chute tilting motor 26 when the current is closed thereto by the closing of the ten-second time delay relays 115, 116.

As the chute 24 reaches the pan filling position, the microswitch 23b at the upper end of the path of the pin 23c is actuated to cut off the tilting motor 26 and thereby cease the tilting action. The vibrator 35 continues to operate until 9½ grams of flour have been deposited within the sample pan 37, and during that time the flour is fed into the feed chute 24 by the auger conveyor 17 and descends, as a result of the vibration, down the tilted chute and into the pan.

If the chute 24 has not returned to tipped-up position within two minutes, the two-minute time delay relays 117 are closed and establish a circuit to a warning signal (not shown) which will be sounded. In other words, the sample should be completely delivered within a two-minute period into the confines of the sample pan 37, and if this is not the case, something has operated improperly and the mill supervisor will be apprised of that situation.

When the sample pan 37 has received 9½ grams of flour, electrovane 67 is actuated by the tilting of the scale beam 64. This tilting, of course, is caused by the weight of the flour deposited into the pan 37 so that the vane 66 is introduced between the spaced coils of the electrovane 67. This electrovane closes a current to the pulsating vibrator 29 which closes the gate 31 on the chute 24 and permits the latch 33 to engage the catch 32 and lock the gate in position. This electrovane 67 also, at the same time, cuts off the current to the auger conveyor motor 15 so that it ceases to withdraw samples from the stack 18. At the same time, this electrovane 67 breaks the current to the pulsating vibrator 35 and thereafter only a dribble feed of the pulverulent material (created by material slipping past gate 31 as a result of the vibrations of vibrator 29) enters into the pan 37 until an additional ½ gram has been added to bring the weight of the sample within the pan to the 10 gram level. Of course, the entire mechanism may be adjusted so as to weigh out a 5 gram sample and make a determination of that weight of the pulverulent material. The weight of the sample causes the scale beam 64 to tilt farther so as to cause the vane 68 to pass between the spaced coils of the electrovane 69. This second electrovane 69 cuts off the current to the vibrator 29 and at the same time establishes a current to the chute tilting motor 15, which in turn tilts the discharge terminal 24a of the chute 24 back to raised position. This electrovane 69 also cuts the current to the two-minute delay relay 117 so that the warning signal will not be sounded.

As the chute reaches the end of its upward tilting movement, the lower microswitch 23a associated therewith is closed by the actuating arm 23c to close the circuit to the timer motor 97 and commence it to again rotate the shaft 98 and the cam carried thereby. The closing of the lower microswitch 23a also cuts off the current to the tilting motor 26. Thereafter the timing motor 97 continues to operate continuously for the remainder of the cycle. As the discharge terminal 24a of the tilting chute 24 tilts upwardly, the flour deposited in the chute 24 and prevented from being discharged therefrom by the gate 31 slides rearwardly and is discharged into the salvage conduit 25 from the rear end of the chute. This insures that none of the flour of the previous sampling is included with that of a subsequent sampling. At the same time, the latch 33 is cammed to released position at the end of the tilting action. The purpose of the latch 33 is to prevent excess flour from dropping into the pan 37 when the chute 24 starts to tilt upwardly at the end of the sample discharging operation.

The timing motor 97 continues to turn the cams 99—106 until the recess on the cams 104 and 106 permits their associated switches 112 and 114 to close. Cam 104 controls two motors, one which rotates the pan (the pan rotating motor 41) and the other 48 which tilts the pan carrying beam. Both of these motors are actuated when the switch 112 associated with the recess of cam 104 closes. Cam 106 controls the current to the infrared lamp 58 so that when the associated switch 114 is permitted to close, the lamp is energized, and when the switch is forced to open position, the lamp is no longer energized. When the beam 39 is tilted, the lamp 58 is also swung to drying position above the beam 37. The cam 50 mounted on the driving shaft 49 of the beam tilting motor 48 bears against the pressure plate 47 which depends from the beam 39. When this pressure plate 47 is actuated by the beam tilting motor cam 50, the beam 39 is tilted to withdraw the chain 54 downwardly, which in turn causes the shaft 57 carrying the lamp 58 to pivot about its longitudinal axis and into drying position relative to the sample pan 37.

It will be recalled that the pan rotating motor 41 is mounted on the beam 39 and is connected with a chain drive 40 to the pan driver 48 which is a cup-shaped element having four pan driving dogs 48 thereon. Prior to the tilting of the beam 39, the pan 37 rests upon the pan support 33 of the scale, this pan support being a small disc with a central recess. The depending positioning pan 37a of the pan extends downwardly into the recess of the pan support 43, and the depending drive pin 37b is engaged by the pan driving dogs 38b to rotate the pan. As the beam tilts, the pan driver 38 engages and lifts the pan 37 off the pan support 43 and rotates the same about a vertical axis. The infrared lamp 58 is directed into the confines of the sample pan 37 as a result of swinging to drying position. The stirring rod 62 extends into the sample and the relative rotation of the sample pan causes the rod to continuously change the upper surface of the sample which is presented to the heat and drying action of the lamp 58. In this manner a much more relatively intense heat may be used, and since an infrared lamp has such penetrating qualities the combined action results in a rapid drying process. So long as the upper level of the sample is continuously changed, and there is moisture remaining in the sample, there is no danger of scorching which would cause inaccurate determinations. By continuously changing the upper surface of the sample, the drying operation is reduced to a matter of a very short period. The drying period continues until the timer motor 48 has turned the cams 104 and 106 sufficiently far to initiate action on the part of the beam tilting motor, as will be hereinafter described.

As the tilting beam 39 reaches the end of its tilting action (immediately prior to the drying operation), a cam 52 on the tilting motor 48 engages a microswitch 53 which breaks the current to the beam tilting motor 48 itself, and this motor remains idle for the entire drying period until, at the end of that period, when the cams 104 and 106 have been driven far enough by the timing motor 97 so that the recess on cam 104 terminates. At that point, the associated switch 112, which is a three-way switch, is pressed inwardly to close a separate circuit to the tilting motor 48, and cam 106 opens its associated switch 114 and thereby cuts off the current to the lamp 58. The tilting motor 48 then continues to operate and its pressure plate engaging cam 50 rotates, thereby permitting the pressure plate 47 to retract and permit the tilting beam 39 to commence to tilt back to its original position. When the tilting beam reaches its original position, the cam 52 on the beam tilting motor 48 releases the microswitch 53 which breaks the current to the beam tilting motor 48. As the beam tilts back, the pan driver 38 is lowered and the pan 37 is again engaged by the pan support 43 of the scale mechanism M. In so doing, the chain 54 to the lamp carrying shaft 57 is released and the weight thereon causes the shaft to pivot about its longitudinal axis, thereby swinging the lamp to one side to non-drying position.

When the tilting beam 39 is permitted to tilt back and the chain 54 connecting the beam to the lamp carrying shaft 57 permits the weighted shaft to pivot to swing the lamp sidewise, the lamp engages the lever arm 53 of the stirring mechanism and causes the stirrer 52 to be swung upwardly and laterally away from the pan.

The return of the pan 37 to the pan support 43 of the scale mechanism causes the scale to automatically register the weight of the dried sample and the interpolation of the loss of weight is displayed in the two places, namely upon the continuous chart 78 through the recording mechanism which is actuated by the third electrovane 71 by the beam of the scale, and also at a reading window on the scale. At the end of the drying action and return of the beam 39, cam 111 cuts in a switch which energizes electrovane 71 which, when entered by the beam 64, actuates the motor 74 which drives shaft 73. The rotation of the shaft 73 causes the gear mechanism 72 to lower until the extreme end 70 of the beam balance 64 passes between the coils of the electrovane to energize the same. When electrovane 71 is energized, it cuts off the current to the motor 74 so that the gear mechanism is arrested at that position. The downward movement of the gear mechanism 72 causes the shaft 75 to rotate about its longitudinal axis and, through the gear reduction 76, to swing the recording pen 77 laterally the appropriate distance to indicate accurately upon the chart 78, the moisture content of the sample. When the tilting beam has returned to its original position, the current to the infrared lamp 58 is shut off by cam 106 moving its associated switch 114 to open position.

After the recording has been completed as hereinbefore described, the timing motor 97 which is continuing to operate, will move cam 107 to energize a time stamp 79 for the chart 78. Thus the time of the determination will be stamped upon the chart opposite the recording made by the recording pen 77. Thereafter cams 102, 103 and 104 come in at approximately the same time. Actually cam 104 moves so as to permit its associated switch 112 to close first to energize the beam tilting motor 48 and the pan rotating motor 41. This motor 41 tilts the beam until stopped by its second cam 52 and limit switch 53, and the pan is lifted by the pan driver 38 and rotated thereby. Thereafter cam 103 permits its associated switch 111 to close and this energizes the vacuum chute moving motor 85 which is connected by gear mechanism 83, 84 to the vacuum chute D to lower its lower end 82 to a position immediately above the pan 37 carried by the scale. The limit switches 90, 91 at both ends of the path of movement of the chute prevent the chute from moving downwardly or upwardly too far. When the chute reaches a position immediately above the pan so that its spacer element 86 engages the bottom of the pan and its brush 92 extends into the confines of the pan against the bottom thereof, the downward movement of the lower part 82 of the chute D will be stopped because the microswitch 91 will cut off the vacuum chute moving motor 85. Immediately thereafter cam 102 permits its associated switch 110 to close to energize the vacuum inducing mechanism 96 which causes the vacuum chute D to draw the material upwardly out of the pan. As the pan rotates, the brush 92 dislodges all fine particles from the bottom of the pan and these are sucked upwardly through the vacuum chute D.

After the material has been drawn out of the pan, cam 102 cuts out the vacuum mechanism 96 and thereafter cam 103 cuts in the reversible vacuum chute moving motor 85 so that the lower portion 82 of the vacuum chute D is moved upwardly until the limit switch 90 at the upper end of the path of movement is engaged, whereby the current to the vacuum chute moving motor 85 is again cut off. Thereafter the second recess of cam 104 reaches its end and presses inwardly the switch 112, which is a three-way switch, and thereby closes a separate circuit to the beam tilting motor 48 to thereby tilt the beam back to the position where the pan rests upon the pan support 43 of the scale. This switch 112 at the same time cuts off the current to the pan rotating motor 41. At the end of the tilting action of the beam, the cam 52 on the beam tilting motor 48 cuts out the current to that motor. Thereafter cam 100 closes the current to a solenoid valve 118 which opens an air conduit 119 connected to a source of compressed air (not shown). The conduit terminates within the tilting chute as shown and is directed so as to dislodge particles of the previous sample which may have stuck within the chute. The timing motor 97 continues to rotate the cams until cam 100 cuts off the current to the solenoid valve and cam 99 has its recess opposite its associated switch 107. It again energizes all of the timing relays 115—117 and the entire operation commences to repeat itself.

Thus it can be seen that we have provided novel apparatus which will weigh out a sample of a predetermined weight without supervision. The entire weighing out procedure is automatic and is accomplished quickly and accurately. This apparatus deposits the sample of exact weight within the confines of the pan where the pan is disposed in weighing position. No supervision or manual effort is required and not even any mental effort is required such as reading the scale to determine that the sample is accurately weighed.

It will be noted that our novel mechanism automatically brings the drying mechanism into play once the sample has been selected and deposited within the the confines of the pan. The mechanism dries the sample rapidly and without scorching. The constant and automatic stirring of the sample continuously changes the upper surface of the sample which is presented to the source of heat and thus effects a quicker and more efficient drying operation. It should also be noted that our apparatus automatically weighs and records the results of the determination. In fact, it makes the determination and records it for later use. There is no need for supervision of the device and it eliminates substantial and tedious and pains-taking effort. It is equally as accurate as if done manually, and in fact eliminates many opportunities for the introduction of air. It will be noted that the pan remains at all times within the drying chamber and does not need to be handled manually and moved from a scale to a drying device. Hence there is no possibility of absorption of moisture from the air while transferring the pan into and out of the scale.

It is clear from the above that our apparatus for selecting samples of predetermined weight represents a distinct advance in the field of moisture content determinations and makes it possible for moisture content determinations to be made more quickly and efficiently.

Portions of the subject matter disclosed in the present application are claimed in companion applications Serial Numbers 514,946 and 514,947, filed on even date herewith.

It will, of course, be understood that various changes may be made in the form, details, arrangement and proportions of the various parts without departing from the scope of our invention.

What is claimed is:

1. Automatic sampling apparatus for weighing out small and accurate samples of a predetermined weight for moisture-content determination purposes, said apparatus comprising a pulverulent material-carrying open-ended chute mounted for tilting movement about a transverse axis intermediate its end portions, one of said end portions having a discharge terminal tiltable upwardly to an elevated position relative to the opposite end of said chute, chute-tilting mechanism for causing said chute to tilt about said transverse axis to such elevated position, flow-regulating means carried by said chute adjacent said discharge terminal for controlling the flow of material through said material-carrying chute, an analytical beam balance having a sample pan-supporting portion capable of vertical movement only disposed adjacent said discharge terminal in position to receive material therefrom when permitted by said flow-regulating means, and variable inductance control means mounted adjacent said beam balance and actuated thereby, said variable inductance control means being connected in actuating relation with said chute tilting mechanism to cause the same to tilt the chute to move the discharge terminal end portion of the chute upwardly to such elevated position when a sample of predetermined weight has been discharged therethrough to cut off the flow of material through said discharge terminal and cause the material remaining within the chute to be emptied by gravity from the opposite end of said chute.

2. Automatic moisture-content-determination sampling apparatus for weighing out small and exact samples of a predetermined weight for moisture-content determination purposes, said apparatus comprising a material-carrying open-ended chute mounted for tilting movement about an axis extending transversely thereto and disposed intermediate its end portions, said chute having a discharge terminal at one of its ends tiltable to an elevated position relative to the opposite end of said chute, chute-tilting mechanism for tilting said chute about said transverse axis, flow-regulating means within said chute and tiltable therewith and disposed adjacent said discharge terminal for controlling the flow of material therethrough when said terminal is lowered, an analytical beam balance having a sample pan-supporting portion incapable of lateral movement and disposed adjacent said discharge terminal in position to receive material therefrom when permitted by said flow regulating means, and control means connected to said beam balance and connected with and controlling said flow-regulating means to cause the same to cut off the flow of such material through said discharge terminal when a sample of exact predetermined weight has been discharged therefrom, said control means being actuated by the beam of said beam balance when a sample of such weight has been received from said discharge terminal, said control means also being connected to and controlling said chute tilting mechanism to cause the same to be actuated to tilt the chute to move the discharge terminal end portion of the chute upwardly to such elevated position when a sample of such weight has been discharged through said discharge terminal.

3. Sample selecting apparatus comprising a balance, a sample pan supported by said balance, a pulverulent material-carrying open ended conduit having a discharge terminal discharging into said sample pan, means adjacent said discharge terminal of said conduit for limiting the flow of material through said material-carrying conduit, control means controlling said first mentioned means and causing the same to completely stop the flow of such material through said discharge terminal when a sample of exact predetermined weight has been discharged into said pan, said control means being connected to said balance and actuated thereby when such a sample of predetermined weight is received within said pan, said conduit being tiltable about an axis extending transversely thereof to a position wherein said discharge terminal is disposed substantially above said axis to thereby cause the material therein to be discharged from the opposite end thereof, and tilting mechanism connected to said conduit and controlled by said control means to tilt said conduit to such position when such a sample of predetermined weight has been received within said pan.

4. Automatic moisture content determination sampling apparatus for weighing out small and accurate samples of a predetermined weight of pulverulent material, said apparatus comprising a pulverulent material-carrying open-ended chute mounted for tilting movement about an axis extending transversely thereto and disposed intermediate its end portions, said chute having a discharge terminal at one of its ends, chute tilting mechanism connected to said chute for tilting the chute about said transverse axis such that the discharge terminal of the chute is disposed in an elevated position relative to the opposite end of the chute, flow regulating means adjacent said discharge terminal and movable within said chute for controlling the flow of material therethrough when said discharge terminal end is lowered, weight-responsive mechanism disposed adjacent said discharge terminal in position to receive therefrom and responsive to the weight of a sample of material discharged therefrom, and control means connected to said flow regulating means and to said weight-responsive mechanism and actuated by the latter to control said flow regulating means to cause the same to cut off the flow of such material through said discharge terminal when a sample of exact predetermined weight has been discharged therefrom, said control means being connected in controlling relation to said chute tilting mechanism to substantially simultaneously cause the same to be actuated and thereby tilt the chute such that the discharge terminal end of the chute is raised to such elevated position.

5. Sample selecting apparatus comprising a balance, a sample pan supported by said balance, a pulverulent material-carrying conduit having a discharge terminal discharging into said sample pan, conduit-directing mechanism drivingly connected to said conduit, first control means responsive to a predetermined position of said balance and connected to said mechanism for controlling actuation of said mechanism to direct said conduit and the flow of material therethrough away from said sample pan when a sample of given weight has been discharged from said conduit into said pan, and second time-regulated control means connected to said mechanism for automatically causing said conduit and the flow of material therethrough to be subsequently redirected into said sample pan.

6. The structure defined in claim 5 including a flow-sampling device positioned to discharge into said conduit and constructed and arranged to continuously select samplings from a flow of pulverulent material.

7. The structure defined in claim 5 wherein said conduit is open-ended, and is tiltably mounted intermediate its ends for tilting movement about an axis extending transversely of said conduit between alternate positions in which positions each end of said conduit is alternately at a higher and lower elevation relative to the other end.

References Cited in the file of this patent

UNITED STATES PATENTS

| | | |
|---|---|---|
| 2,089,526 | Andreas | Aug. 10, 1937 |
| 2,258,182 | Howard | Oct. 7, 1941 |
| 2,614,786 | Caron et al. | Oct. 21, 1952 |
| 2,625,361 | Schrock | Jan. 13, 1953 |
| 2,626,042 | Aldridge | Jan. 20, 1953 |
| 2,634,080 | Knobel | Apr. 7, 1953 |
| 2,634,082 | Knobel | Apr. 7, 1953 |
| 2,694,510 | Kindseth | Nov. 16, 1954 |
| 2,741,450 | Thayer et al. | Apr. 10, 1956 |

FOREIGN PATENTS

| | | |
|---|---|---|
| 714,510 | Germany | Dec. 1, 1941 |
| 959,360 | France | Sept. 26, 1949 |